3,362,984
CYCLIZATION OF ACETYLENIC COMPOUNDS
BY Co(CO)₃NO
Paolo Chini and Alberto Santambrogio, Milan, and Marcello De Malde, San Donato Milanese, Italy, assignors to Snam S.p.A., Milan, Italy, a company of Italy
No Drawing. Filed May 14, 1964, Ser. No. 367,558
Claims priority, application Italy, May 31, 1963, 11,327/63, Patent 697,118
4 Claims. (Cl. 260—475)

The invention relates to a novel catalyst for the well known ring-closing process for converting acetylene compounds into aromatic compounds.

According to the present invention. compounds containing the acetylene bond are converted into aromatic compounds by trimerization, by employing $Co(CO)_3NO$ as a catalyst.

Catalysts for performing such a reaction are well known in the technical literature, but the novel catalyst system affords several advantages over those known catalysts. For example, while 3-methylbutyne-1-ol-3 with catalysts based on $Ni(CO)_2(PPh_3)_2$ or $Ni(CO)_3(PPh_3)$ is conducive to a mixture whose predominant component is 1,3,5-tris(α-hydroxy-α-methyl - ethyl)benzene, the same acetylene compound, by employing the novel catalyst system, is conducive only to 1,2,4-tris(α-hydroxy-α-methyl-ethyl)benzene.

The novel catalyst system is definitely more active than the catalysts based on $Co(CO)_8$ or acetylene complexes thereof, and permits to trimerize compounds such as propargyl alcohol and butyne-diol.

The new catalyst system affords the advantage, over organic-metallic catalyst systems such as $Al(C_2H_5)_3$ in conjunction with $TiCl_4$, of being capable of employment in many a case in which those systems cannot be employed owing to their high reactivity towards many functional groups.

Finally, the new catalyst systems exhibit the advantage, over systems based on the employment of sodiumborohydride and salts of transition metals, of dispensing with the use of the alkali metal borohydride, which is a precious and expensive compound. The catalyst $Co(CO)_3NO$ is active in slightest concentrations: from 1 to 10 millimoles of catalyst per mole of acetylene compound are preferably employed.

The acetylene compounds which can be used in the present invention have the general formula $$R—C≡C—R_1$$

wherein R and $R_1$ are organic, metallic-organic radicals or hydrogen atoms. Examples representative of these compounds are:

$CH_3—O—CO—C≡C—CO—O—CH_3$ $CH_3—O—CO—C≡CH$ $C_6H_5—C≡CH$ $CH_2=CH—C≡CH$ $HC≡C—CH_2OH$

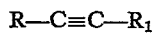

$HOCH_2—C≡C—CH_2OH$ $CH_3—C≡CH$ $C_4H_9—C≡C—C_4H_9$

In general, whenever either R or $R_1$ contains an electron-capturing group in the α-position with respect to the triple bond there are more reactive compounds which can be very promptly trimerized. Should this be the case, low reaction temperatures are often sufficient.

If acetylene compounds which are gaseous at room temperature are to be used, it is preferred to operate under positive pressure.

The trimerization reaction can be advantageously carried out in the presence of organic thinners. As a matter of fact, in many a case, in the absence of a thinner and even operating with small amounts of catalyst, a reaction can be established so violently as to be conducive to the explosion of the reaction vessel. For example, an explosion was ascertained when heating at 50° C.–60° C. a mixture consisting of 10 millimoles of catalyst and a single mole of methylbutynol. As thinners, there can be employed hydrocarbonaceous compounds such as benzene, petroleum ether, nor.hexane, cyclohexane and also different compounds such as diethyl ether, tetrahydrofuran, acetone, methanol, ethanol, acetonitrile, chloroform, ethyl acetate and others.

In general a thinner having a boiling point in the range 30° C.–120° C. is preferred, so as to carry out the reaction at moderate temperatures, while concurrently removing the reaction heat by causing the solvent to boil.

The reaction is preferably carried out within the temperature range specified above, but it can also be carried out below 30° C. or also above 120° C. This is also a function of the reacivity of the acetylene compound employed. In general, high temperatures, as high e.g. as 150° C., should be avoided, since they are conducive to the formation of by-products and cause a more rapid degradation of the catalytically active intermediate compounds.

The catalyst, $Co(CO)_3NO$ is active also in the presence of tertiary phosphines such as triphenylphosphine, but the addition of such substances does not seem to afford any special advantage.

The present invention is preferably carried out by operating in an oxygen-free atmosphere, such as e.g. nitrogen, methane, carbon dioxide, hydrogen, etc. The examples reported hereinafter are illustrative and do not limit the present invention.

EXAMPLE 1

A three-necked flask, equipped with cooling coil, reflux condenser and drop-funnel is charged, in a nitrogen atmosphere, with 100 cu. cms. of nor.hexane, 85 grs. 3-methylbutyne-1-ol-3 and 2.5 millimoles of $Co(CO)_3NO$. The mixture is gently brought to a boil, at 67° C. After 4 hrs. the mixture is allowed to cool and filtered and the cake is collected on a filter: it amounts to 76.2 grs. This residue is formed by 1,2,4-tris(α-hydroxymethyl-α-methyl-ethyl)benzene, practically pure, having a M.P. of 184° C.–185° C. The yield is 95% and the conversion ratio 90%.

If, instead, 2.5 millimoles of $Ni(CO)_3PPh_3$ are employed as a catalyst, a yield of 63% and a conversion ratio of 90% are obtained. Such being the case, the trimer has a M.P. of 119° C.–124° C.

EXAMPLE 2

Very much the same procedure as in Example 1 is followed, except that methanol is used in lieu of n-hexane. The yield of 1,2,4-tris(α-hydroxy-α-methyl-ethyl)benzene is 85% and the conversion ratio is 74%. By operating with benzene the yield is 72% and the conversion ratio is 95%.

EXAMPLE 3

Very much the same procedure as in Example 1 is used, but phenyl-acetylene is employed as the acetylene compound and the solvent is benzene. After 150 mins. the conversion ratio amounts to 54%. The reaction product, on removal of the benzene, is pitchy reddish product which, extracted with acetone in the cold, gives rise to the separation of 4.5 grs. of a white residue. This latter, on recrystallization from boiling xylene, melts at 260° C. and has a mol. wt. of 510 corresponding to a pentamer of phenyl-acetylene having, presumably, a pentaphenyl-dihydro-naphthalene-like structure.

From the acetone solution, through a slow crystallization, notable amounts of 1,2,4-triphenylbenzene are separated, which, on recrystallization from petroleum ether, has a M.P. of 120° C.

EXAMPLE 4

The procedure is that of Example 1, but the acetylene compound is isopropenyl-acetylene and benzene is the solvent. A liquid is obtained which boils at about 70° C. under an absopressure of 0.001 millimeter of mercury, and consists mainly of 1,2,4-tris-isopropenyl-benzene.

EXAMPLE 5

Eighty-six (86) grs. of butyne-diol-1,4 are caused to react with 100 cu. cms. of benzene, 100 cu. cms. of ethanol (95% $C_2H_5$—OH) and 5 millimoles of $Co(CO)_3NO$. The temperature is maintained at about 70° C. for 6 hrs. Upon cooling 11.7 grs. hexamethylol benzene are separated. The product can be recrystallized from boiling water, or it can also be sublimated at 230° C. under an abs. pressure of 0.001 mm. of mercury. The pure product melts at 296° C.–297° C. (dec.).

EXAMPLE 6

The procedure of Example 1 is followed, but the compound to be trimerized is propargyl alcohol. A conversion ratio of 42.8% is obtained for a mixture of two compounds which very presumably are 1,2,4- and 1,3,5-tris-methylolbenzene. Analogous results are obtained with butyne-1-ol-3.

What we claim is:

1. A process for the preparation of aromatic compounds by trimerization of an acetylene compound selected from the group consisting of $$CH_3—O—CO—C\equiv C—CO—O—CH_3$$
$$CH_3—O—CO—C\equiv CH; \quad C_6H_5—C\equiv CH$$
$$CH_2=CH—C\equiv CH; \quad HC\equiv C—CH_2OH$$

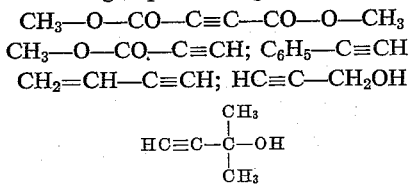

$$HOCH_2—C\equiv C—CH_2OH; \quad CH_3—C\equiv CH; \text{ and}$$
$$C_4H_9—C\equiv C—C_4H_9$$

in the presence of a catalyst consisting of $Co(CO)_3NO$.

2. A process according to claim 1, wherein the reaction temperature is between 0° C. and 150° C.

3. A process according to claim 1, which is performed in the presence of an organic solvent having a boiling point between 30° C. and 120° C.

4. A process according to claim 1 wherein the reaction temperature is between 30° C. and 120° C.

References Cited

UNITED STATES PATENTS

| | | |
|---|---|---|
| 2,542,551 | 2/1951 | McKeever et al. |
| 2,591,587 | 4/1952 | Mowry _____ 260—618 X |
| 2,617,831 | 11/1952 | Mowry _____ 260—618 |
| 2,723,299 | 11/1955 | Tanaka et al. _____ 260—669 |
| 2,846,490 | 8/1958 | Witt _____ 260—673.5 X |
| 3,125,610 | 3/1964 | Daendliker _____ 260—673 |
| 3,187,013 | 6/1965 | Zeiss et al. _____ 260—673 X |

OTHER REFERENCES

Hubel et al., Chem. Abstracts, vol. 54, pp. 9839–41 (1960).

Reppe et al., Justus Liebigs Annalen der Chemie, vol. 560, pp. 140–16 (1948).

Rose et al., J. Chem. Soc., 1950, pp. 69–70.

BERNARD HELFIN, *Acting Primary Examiner.*

LEON ZITVER, *Examiner.*

T. G. DILLAHUNTY, *Assistant Examiner.*